April 10, 1951          O. A. MULLER          2,548,490
DEPTH AND ANGLE GAUGE
Filed Nov. 1, 1944
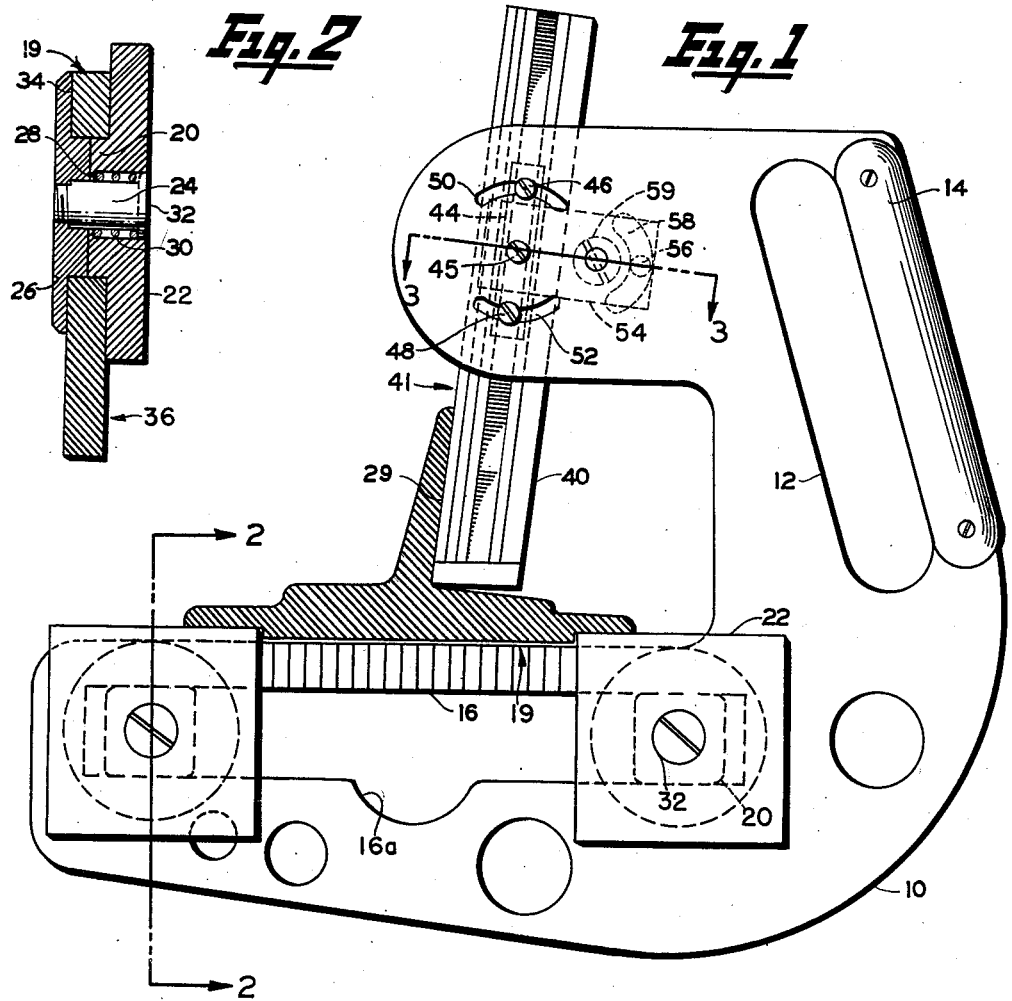
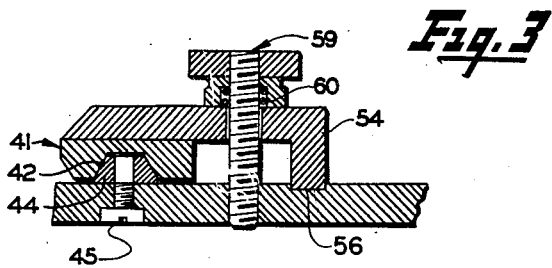
INVENTOR.
OSCAR A. MULLER
BY Edwin Coates
ATTORNEY Patented Apr. 10, 1951

2,548,490

UNITED STATES PATENT OFFICE 2,548,490

DEPTH AND ANGLE GAUGE

Oscar A. Muller, Los Angeles, Calif., assignor to Douglas Aircraft Company, Inc., Santa Monica, Calif.

Application November 1, 1944, Serial No. 561,341

5 Claims. (Cl. 33—174)

The invention relates to gauges that may be readily carried and manipulated by an inspector to check the accuracy of elongated machined parts made to a pattern which varies in dimensions from one point to another in its length, although it may also be used equally well on other types of machined parts. A preferred embodiment of the invention is hereinafter described which is specifically designed for use with spar caps, though the gauge is not necessarily limited to such use.

Spar caps are parts constituting the flanges of girders forming the spars or spanwise main strength members of airplane wings, and in modern monoplanes, are of considerable length and are carefully designed and machined as they have to be very strong while being kept as light in weight as possible, these requirements resulting in many changes in critical dimensions throughout the length of the spar cap.

The spars are usually employed in a cantilever construction and thus have to support a stress greatest toward the root section adjacent the fuselage, and diminishing toward the tip or outer end. In order to secure maximum strength and lightness, the spars are built up as girders having flanges of diminishing thickness and width from root to tip, the flanges being connected by a built up web riveted to an attaching flange projecting inwardly of the wing and along the length of the spar cap.

Since the wing may be thicker on one side of the spar cap than on the other, and the flanges are arranged flat on, or flush with, the outer skin of the wing, the attaching flange is necessarily set at an angle to the body of the spar cap, the angle varying with various sizes and arrangement of the spars.

In most cases it is preferred to provide the outer surface of the spar caps with a longitudinal recess along each edge, to which the skin of the wing is riveted, and since the thickness of the skin of the wing is often reduced in thickness from the root of the wing to the tip, the depth of the recess must be checked at different points in the length of the spar cap for correct depth of cut. Also, since the width of the spar cap between root and tip may vary in different models of airplane, provision should be made to check the width of the spar cap top. All the dimensions above referred to may be different in different models, making it necessary in present practice to use a large number of specially made gauges.

An object of the invention is to provide a gauge for elongated pieces, or for a plurality of pieces, having dimensions that differ at various points or between one piece and another by a given amount, the gauge being readily set for each measurement to be checked.

A further object of the invention is to provide a gauge of the kind referred to with means which will enable the angle of a part, such as a flange projecting from a surface of the elongated member, to be checked.

Another object of the invention is to provide a gauge of the kind described capable of checking a plurality of dimensions and angles by a plurality of means which may be readily adjusted individually to take care of a change of one or more dimensions at a different point in the length of the test piece while other dimensions remain unchanged.

Yet another object of the invention is to provide a gauge of the kind described of simple but rugged construction and in which the various adjustable elements are simply though securely held in adjusted position.

Still further features of the invention will hereinafter appear in the following description and accompanying drawings.

A preferred embodiment of the gauge, designed to check airplane spar caps, is herein disclosed and illustrated by way of example, but the scope of the invention is not in any way limited by this illustrative embodiment, but only as defined by the scope of the appended claims.

In the drawings, in which identical numerals indicate identical parts,

Figure 1 is a view in side elevation of the gauge, a section of spar cap undergoing inspection by the use of the gauge being shown in cross section.

Figure 2 is a detail cross section on the line 2—2 of Figure 1 and on a larger scale.

Figure 3 is a detail cross section on the line 3—3 of Figure 1 and on a larger scale.

In the drawing, 10 indicates the gauge body which is substantially C-shaped, and is preferably formed from a single piece of plate. The body is formed with a finger hole 12 adjacent its upper rear edge, and a hand hold 14 is secured to the body between the finger hole and the rear edge of the same. An elongated slot or guideway 16, formed in the lower portion of the gauge body, is machined so that the defining edges thereof are parallel to a horizontal bed 19 formed on the upper side of the lower portion of the gauge body. The bed 19 provides a piece plane for the gauge and is adapted to receive the piece to be gauged.

Guide blocks 20 are slidably mounted in the slot 16 and carry gauge blocks 22 having a width greater than the guide blocks. The guide blocks are preferably formed integral with the gauge blocks although they may be separate units rigidly secured to the blocks 20. It will be seen that the one edge face of each gauge block projects above the surface of the bed and the projecting edge face forms a gauge surface for gauging the depth of the longitudinally extending recess formed in each edge of the work piece or spar. These recesses are adapted to receive the edges of the wing skin and vary in depth along the spar. The gauge blocks, referring now to Figure 1, are shown as four sided and the distance from each edge to the center is different so that by merely rotating the blocks, recesses of different depths may be gauged.

To permit the gauge blocks to be rotated so that the different edge faces thereof may be presented to the work piece, a bolt 24 is passed through a bore centrally formed in each guide and gauge block assembly and threaded into a flat retaining nut 26. The bore of each assembly is enlarged to form a shoulder 28 intermediate the ends of the bore and a spiral spring 30 is disposed within the enlarged portion of the bore. One end of the spring seats on the shoulder 28 and the opposite end of the spring acts against the head 32 of the bolt 24. It will be seen that after the retaining nut 26 is tightened against the face 34 of the gauge body 10, the spring acts to hold the gauge blocks against the face 36 of the gauge body. The head 32 of the bolt is provided with a slot to permit the bolt to be tightened or loosened to adjust the pressure with which the gauge block is held against the face 36 of the body of the gauge.

It will now be seen that the guide blocks 20 may be withdrawn from the slot 16 against the action of the spring 30 which is held between the annular shoulder 28 and the bolt head 32, the latter then moving into the bore in the block, to permit the gauge block 22 to be rotated about the axis of the bolt so that a different edge face may be moved into gauging position. It will be understood that when the gauge block is released and the guide block 20 moves back in the slot 16, the assembly will be tightly held against rotational movement. Alternatively, the gauge blocks 22 may be slid to the center of the slot, and the guide blocks 20 rotated in the enlargement 16a therein provided to bring another face of the gauge block 20 into operative position and the block returned to its proper position in the slot.

As the guide blocks are slidably mounted in the slot 16, the guide blocks may also be slidably adjusted transversely of the spar so that the gauge may be used to gauge different depths of the recess at different distances along the spar. The gauge body may, if desired, carry adjacent the guide slot 16 reference lines to indicate the position of the guide blocks for gauging predetermined test stations along the spar.

The test piece, which is a length of spar cap, is shown with an attaching flange 29 projecting from one face thereof. The face of this flange, against which the web elements are to be positioned and secured, must be accurately machined to the correct angle with respect to the body of the spar cap. This angle may be gauged by the tool of the present invention, and to this end the upper arm of the gauge body carries a vertically and angularly adjustable stem 40. The stem is formed with a gauging face 41 and a keyway 42 for receiving a key 44 mounted on the upper arm of the gauge body.

The stem may be rotated with key 44 about a pivot 45 which is set into member 10 and has its inner end plain and unthreaded to constitute a pivot, by loosening clamping screws 46 and 48, the inner ends of which reach into key 44 and the shanks of which are free to slide in arcuate slots 50 and 52 formed through the plate from which the gauge body is made. The heads of the clamping screws 46 and 48 engage against the face of the gauge so that on being tightened, when the stem 40 has been brought to the correct angle to the vertical, the key may be locked in this position. Means for retaining the stem 40 in correct vertical position and in secure engagement with the adjusted key is provided by a clamping piece 54 which is of L shape, the shorter leg of the clamping piece being furnished with a peg 56 riding in a groove 58 formed in the one face of the gauge body.

The clamping piece 54 is tightened by means of a threaded stud 59 serving as a pivot for the clamping piece and having an end threaded into a bore in the gauge body. Preferably a spiral spring 60 is arranged between the head of the stud 59 and the face of the clamping piece 54 to enable the clamping piece to be freed so that the stem 40 may be moved to any position while still retaining sufficient pressure on the clamping piece to ensure smooth adjustment of the stem.

The vertical adjustment of the stem permits the stem to be properly positioned for test pieces of different thickness, or to be adjusted to different thickness of the test piece at different stations. It will be noted that the stem may be moved toward and from the work without affecting the angular setting of the stem. The vertical adjustability of the stem also enables the height of bosses or the depth of recesses formed in the body of the spar cap to be checked.

Spar caps may be many feet long and the change in the various dimensions thereof may be effected either continuously or in a series of steps. In either event, by inspecting the critical dimensions of the spar cap at a definite number of stations, it can readily be determined whether the spar cap has been machined within the tolerances allowed. With the gauge herein described and shown in the drawings it would be possible to inspect the spar cap at four stations. If changes in dimensions occurred at a greater number of stations, an additional gauge or gauges could be provided.

It will be seen that the gauge of my invention provides an inspection tool which may be easily accurately, and rapidly used to inspect a spar cap at a plurality of points, and that spar caps of varying designs may be inspected by the same gauge.

If the depth of cut differed between one design of spar cap and another, the gauge blocks could readily be changed for gauge blocks complying with the particular dimensions of the new spar cap, while obviously the stem 40 can be set at any new angle of the flange of the spar cap.

It is believed that the gauge of this invention provides a very useful advance in gauges for the inspection of elongated pieces such as spar caps, the inspection of which has been a laborious and lengthy process, owing to the plurality of points at which inspection must be made and the number of different dimensions which have to be checked at each inspection station. By the use of the gauge of my invention the number of spar caps which can be inspected in a given work period has been multiplied many times, and it is therefore believed that the invention is one possessing considerable utility in the field of inspection instruments.

I claim:

1. A gauge comprising: a body portion providing a base plane for work to be checked; a guideway in said body portion parallel to said base plane; gauge blocks each having a laterally projecting part adapted to be received in and accurately positioned by said guideway, and a plurality of operative surfaces any one of which may be brought into position to extend above said base plane to a distance different for each surface and engage against the test piece to maintain it at a known distance above the base plane, the correctness of the distance determining the accuracy of the test piece at the point of engagement; a threaded stem having a head sliding in a bore in said gauging block and laterally projecting part, a retaining member into which said stem is screwed and engaging against the opposite side of the gauge to said gauge block; a shoulder projecting inwardly toward the stem from said laterally projecting part; resilient means positioned between said head and said shoulder thereby permitting the gauge block to be withdrawn laterally and turned into position to bring a desired face into operation and released to again position the laterally projecting part of said gauging block in the guideway.

2. A gauge comprising: a body portion providing a base plane for work to be checked; a support extending above said base plane; a gauging element mounted on said support for movement toward and from said base plane and to extend at a desired angle to said base plane; a key carried on said support; a keyway formed in said gauging element mounted on said support whereby said gauging element is guided in movement toward or from said base plane; clamping means whereby said gauging means may be retained in adjusted position on said support; a guideway in said body portion parallel to said base plane and on the side opposite to said support extending over said base plane; gauging means having laterally extending portions accurately fitting in and slidable in said guideway, and a plurality of operative surfaces any one of which may be brought into position to extend above said base plane to a distance different for each surface and engage against the test piece to maintain it at a known distance above the base plane, the correctness of the distance determining the accuracy of the test piece at the point of engagement; mounting means for said gauging means whereby a desired surface of said gauging means may be brought into operative position; and means for retaining said gauging means in adjusted position.

3. A gauge, comprising: a body portion including a work-piece base plane; a support member lying above said plane; an angle gauging element mounted on said support for movement toward and from said plane; means on said support for guiding said element in said movements; means for clamping said element to said support in adjusted positions thereof; a guideway in said body portion underneath said support and extending parallel to said plane; gauging elements having laterally extending portions slidably fitted into said guideway and including a plurality of operative surfaces adapted to be successively brought above said plane predetermined distances to engage said work-piece; retaining means for each gauging element disposed on the opposite side of said body portion from said gauging elements; and means carried by said retaining means and resiliently connecting said gauging elements to said retaining means for retaining said engaging elements in adjusted positions, and for enabling the gauging member to be withdrawn from the guideway while connected to its retaining member so as to enable turning successive faces of said gauging member into operative position.

4. In a gauge, means for gauging the depth of re-entrant surfaces located varying perpendicular distances from an outer surface of a test piece, comprising: a handle; an arm extending laterally from the one end of said handle and including a base-plane extending along its upper edge and adapted to be juxtaposed by means of said handle in substantial parallelism to said outer surface, said arm including a slot extending longitudinally thereof in substantial parallelism with said base-plane; at least one depth-gauge block, the inner face of said block having an inward extension with a polygonal periphery mounted in said slot to position the inner face of said block against the one face of said arm, two opposed sides of the periphery of said extension bearing stably against the sides of said slot and normally preventing rotation of said block; retaining means for said block having an abutment portion bearing against the face of said arm opposite to the first-said face; an axially resilient pivotal connection between said retaining means and said block enabling sliding of said block with said retainng means along the length of said slot; said block having an outer polygonal periphery and having said inner face normally pressed frictionally against said one face of said arm by said resilient connection, each side of said polygonal periphery lying a different distance from the axis of rotation of said block and the intermediate portion of said slot having a substantially greater lateral dimension than the end portions of said slot to loosely receive said inner polygonal extension of said block to enable rotation of said block thereat; thereby to dispose different edges of said block a different distance above said base plane to contact test surfaces lying different perpendicular distances from said outer surface of said test piece; whereby to dispose said base plane different known gauging distances from said outer face of said work, thereby to enable said gauge to test surfaces located different distances above said base-plane.

5. In a gauge, means for gauging the depth of recesses in a work-piece, comprising: a handle, an arm extending laterally from the one end of said handle and including a base-plane for the work-piece extending along the upper edge of said arm, said arm including a slot extending longitudinally thereof in substantial parallelism to said base-plane; at least one depth gauge block having a polygonal periphery and having an inward extension with a polygonal periphery mounted in said slot with two of the opposed sides of the polygonal periphery of said extension bearing flat against the corresponding opposite sides of said slot, the inner face of said block normally bearing unslidably against the one face of said arm; a retaining-nut having an inner face bearing against the opposite face of said arm; a bore extending concentrically through said inward extension of said gauge block and extending eccentrically through said gauge block itself, to enable rotary disposition of different edges of said block different gauging distances above said base plane; the portion of said bore that lies in said inward extension of said block having an annular inwardly extending shoulder at its inner end; a headed member for rotatably connecting the block unit and the nut unit passing longitudinally through said bore with its head normally lying adjacent the outer face of said block and having its opposite end secured in said nut; and resilient means disposed in said bore and interposed between said head and said annular shoulder; whereby to enable constrained withdrawal of said gauge-block outwardly from said face of said arm sufficiently far to enable sliding of said block on said arm to and from laterally outward positions in said slot and to free said inward extension from said slot to permit rotation of said gauge block and extension with respect to said arm.

OSCAR A. MULLER.

REFERENCES CITED

The following references are of record in the file of this patent:

UNITED STATES PATENTS

| Number | Name | Date |
| --- | --- | --- |
| 329,892 | Eckert | Nov. 10, 1885 |
| 697,090 | Keef | Apr. 8, 1902 |
| 996,901 | Ball | July 4, 1911 |
| 1,213,134 | Fellows | Jan. 16, 1917 |
| 1,236,107 | Rollins | Aug. 7, 1919 |